E. H. W. STAHLHUTH.
CAMERA FINDER.
APPLICATION FILED JUNE 2, 1917.
1,312,283.
Patented Aug. 5, 1919.
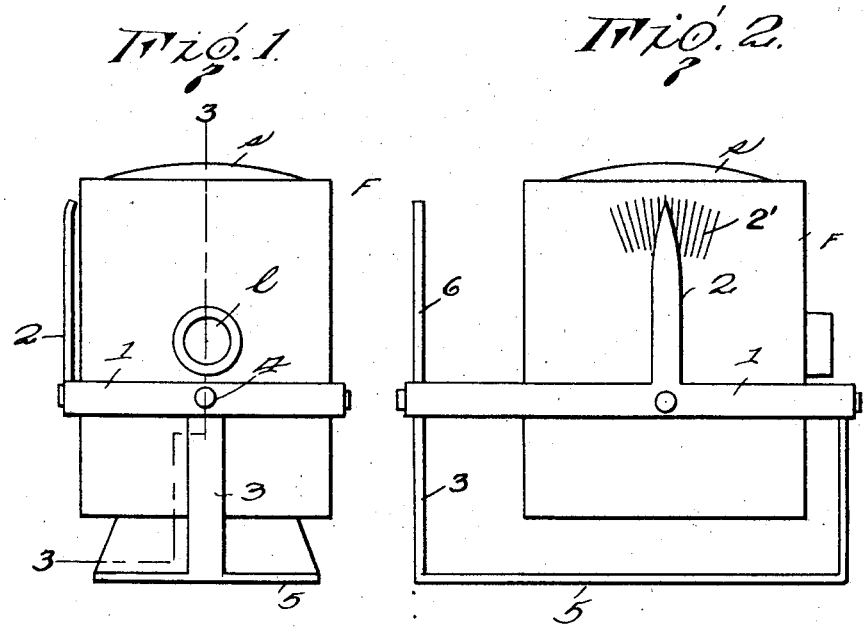
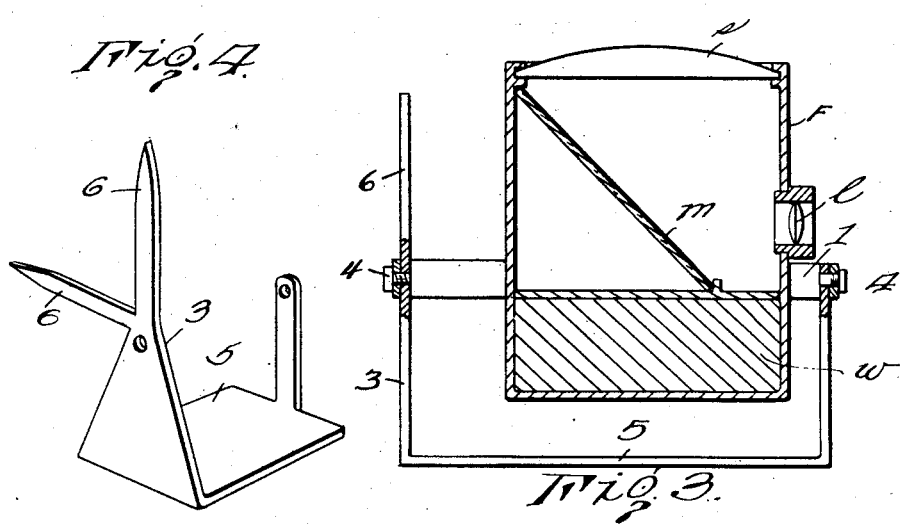
Ernst H. W. Stahlhuth
Inventor
By Geo. F. Kimmel
Attorney

UNITED STATES PATENT OFFICE.

ERNST H. W. STAHLHUTH, OF COLUMBUS, INDIANA.

CAMERA-FINDER.

1,312,283.  Specification of Letters Patent.  Patented Aug. 5, 1919.

Application filed June 2, 1917. Serial No. 172,423.

*To all whom it may concern:*

Be it known that I, ERNST H. W. STAHLHUTH, a citizen of the United States, and resident of Columbus, in the county of Bartholomew and State of Indiana, have invented certain new and useful Improvements in Camera-Finders, of which the following is a specification.

This invention relates to photography and has more especial reference to an improved finder mounting and indicator for cameras.

The invention has for its principal object to provide a position indicating means for finders of cameras whereby an object can be readily located and properly arranged in the finder in order that the same will be fully and accurately projected onto the film upon exposure thereof.

Another object of the invention is to provide a novel mounting for the finder, allowing movement of the same in any direction when sighting an object therein.

The foregoing together with additional advantageous details and arrangements of parts of the preferred embodiment of my invention will be clear from the specific description hereinafter contained, when read in connection with the accompanying drawing forming part thereof, wherein said embodiment of the invention is illustrated for the purpose of facilitating a full understanding of the present improvements.

In the drawing:—

Figure 1 is a front elevation of the finder mounting and indicator,

Fig. 2 is a side elevation thereof,

Fig. 3 is a vertical section through the finder and its mounting taken on the line 3—3 of Fig. 1, and Fig. 4 is a detail in perspective of a portion of the mounting and indicating means.

Referring now more particularly to the drawings and in connection with which like reference characters will refer to corresponding parts throughout the several views, F designates the usual camera finder, including a lens $l$ a reflecting mirror $m$ and a sighting lens $s$ and having the bottom thereof provided with a weighted portion $w$.

Pivotally secured to the opposite sides of the finder F is a substantially square frame 1 having a vertically disposed indicator arm 2 arranged thereon and adapted to coöperate with the graduations 2' arranged on the adjacent side of said finder.

To the free sides of the square frame 1 a second frame 3 is pivotally connected as at 4 and is provided with an enlarged base portion 5, whereby the attachment may be secured to a camera. Upon one side of the frame 3 there is formed vertically and horizontally disposed indicator arms 6, these indicator arms being arranged adjacent another side of the finder F provided with graduations, not shown, with which said arms 6 coöperate to indicate the angular position of the camera.

Due to the oppositely disposed pivotal connections of the frames 1 and 3, it will be understood that movement of the finder in any direction will be permitted. Thus, should the camera be so positioned as to cause the incorrect projecting of an object onto the film thereof, the finder will assume a true perpendicular position, this position being indicated by the vertical indicator arms 2 and 6, whereupon the photographer may then adjust the camera to accord with the position finder. Obviously, vertical and horizontal adjustment of the camera with relation to the finder is permitted by the novel mounting of the latter; the horizontal indicating arm allowing the reversing of the camera when taking pictures of groups or the like.

From the foregoing, it will be appreciated by workers skilled in the art that with my improved device, the correct projecting of an object onto the film when the same is exposed is at all times insured, since, the finder by reason of its novel mounting will at all times assume a true perpendicular position with relation to the object to be photographed.

Manifestly, the construction shown is capable of considerable modification and such modification as is within the scope of my claims, I consider within the spirit of my invention.

I claim:—

1. In combination with a finder, a square frame arranged about the sides thereof and pivotally connected at opposite points thereto, a second frame pivoted to said first frame at points at right angles to its respective pivotal mounting, and indicating means carried on each of said frames.

2. In combination with a finder, a substantially square frame arranged about the finder and pivotally connected at opposite points thereto, a second frame pivoted to the free sides of said first frame, said second frame having an enlarged base portion, and indicating means carried by the first and second frames.

3. In combination with a finder, a substantially square frame arranged thereabout and pivotally engaged with the same at opposite points, a second frame pivoted to the free sides of said first frame and having an enlarged base portion, and vertically disposed indicator arms formed upon said first and second frames.

4. In combination with a finder, having a weighted bottom, a substantially square frame arranged thereabout and pivotally engaged with the same at opposite points, vertically disposed indicator means arranged on said frame, a second frame pivoted to the free sides of said first frame and having an enlarged base portion, and vertically and horizontally disposed indicator arms formed upon said second frame.

In testimony whereof I affix my signature hereto.

ERNST H. W. STAHLHUTH.